United States Patent [19]

Krishnakumar et al.

[11] Patent Number: 4,678,116
[45] Date of Patent: Jul. 7, 1987

[54] WATER HEATER

[75] Inventors: C. K. Krishnakumar, Lombard; Clyde K. Schafer, Glendale Heights, both of Ill.

[73] Assignee: Chamberlain Manufacturing Corporation, Elmhurst, Ill.

[21] Appl. No.: 857,189

[22] Filed: Apr. 29, 1986

[51] Int. Cl.[4] .............................................. F22B 35/00
[52] U.S. Cl. ................................ 236/25 A; 122/20 B
[58] Field of Search ............... 237/19, 8 R; 122/20 B, 122/17, 16; 126/362; 236/25 A

[56] References Cited

FOREIGN PATENT DOCUMENTS 1067670 12/1952 France .................................. 122/17

Primary Examiner—Henry A. Bennet
Attorney, Agent, or Firm—Hill, Van Santen, Steadman & Simpson

[57] ABSTRACT

A compact continuous flow energy efficient gas fired water heater/boiler for use in residential, commercial and industrial buildings wherein cold water enters the heater and flows downward through an outer annulus and then rises up through an inner annulus around a central gas flue, and wherein combustion gas flows upward through the central flue and then downward through a set of heat-conductive tubes and finally upwardly through the middle annulus to the exit. Air flow blower provides draft. The burner is capable of burning gas at widely varying rates of gas flow and is regulated by a gas modulator valve approximately proportional to the rate of hot water usage and the force for the gas modulator is generated by an orifice type differential pressure generator in the inlet water pipe.

6 Claims, 5 Drawing Figures

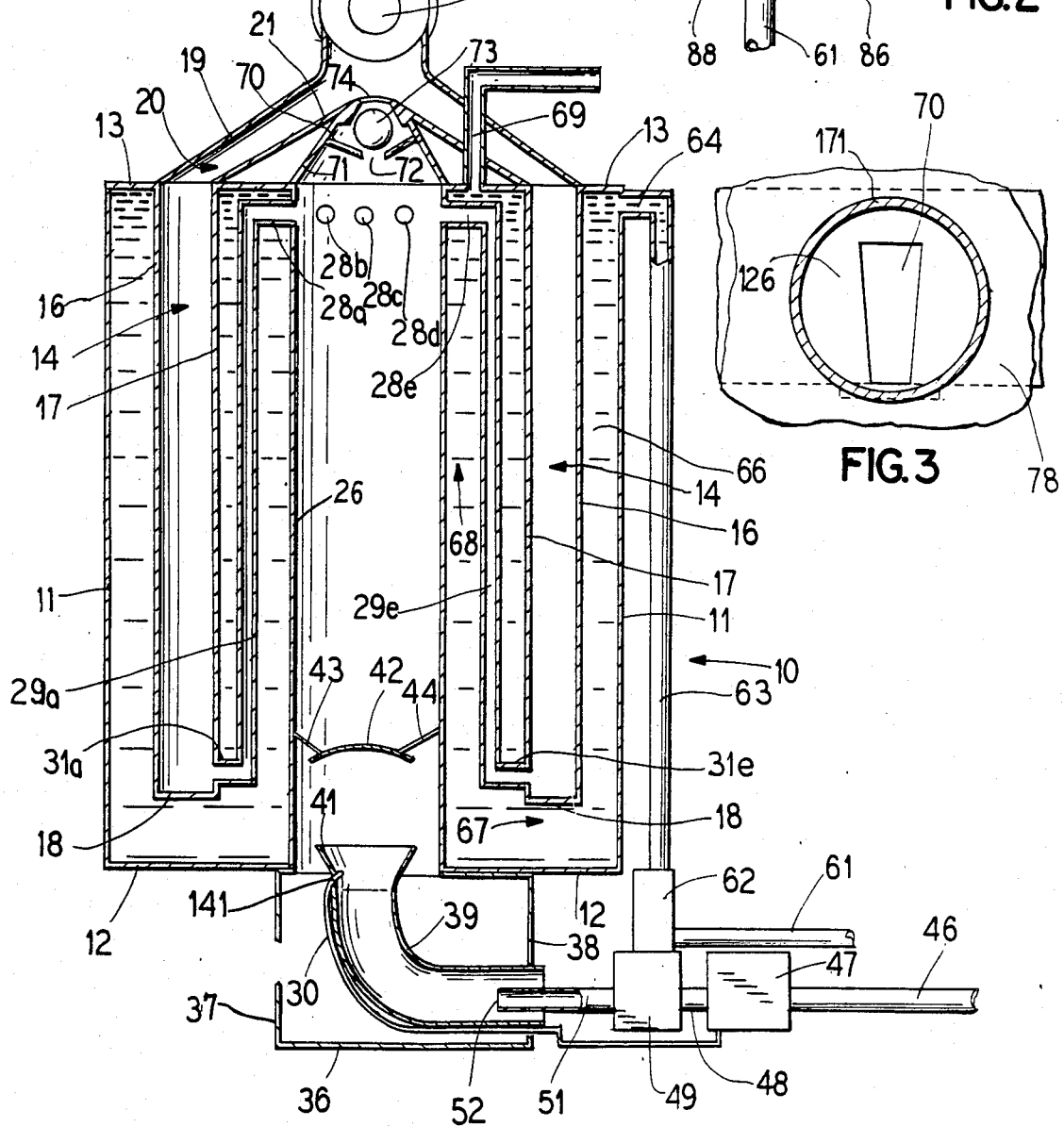

WATER HEATER

BACKGROUND OF THE INVENTION

1. Field of the Invention

This invention relates in general to a compact continuous flow energy efficient gas fired water heater/boiler for use in residential, commercial and industrial buildings and in particular to a novel structure therefore.

2. Description of the Prior Art

Prior art hot water heaters are inefficient and require large storage tanks for the heated water thus resulting in thermal losses. Many prior art hot water heaters require finlike surfaces which protrude into gas passages and provide a complex design for the air/hot gas flow and the water flow. Some prior art devices pass water through tubes and pass hot gas around them, but this is less efficient than the present invention.

SUMMARY OF THE INVENTION

The present invention comprises a compact continuous flow energy efficient natural gas fired water heater/boiler for use in residential, commercial and industrial buildings wherein cold water enters a heater and flows downward through an outer annulus and then rises up through an inner annulus around a central gas flue. Combustion gas flows upward through the central flue and then flows downwardly through a set of copper tubes and finally upward through the middle annulus to the exit. Air flow is induced by suitable blower.

The burner is capable of burning gas stably at widely varying rates of gas flow although the rate of induced air flow remains constant over the entire range. The rate of gas flow to the burner is regulated by gas modulator valve approximately proportional to the rate of hot water usage. The actuating force for the gas modulator is generated by an orifice type differential pressure generator incorporated in the inlet water pipe.

During the operation, the heater maintains the temperature of the hot water within a specific range such as between 130° F. and 160° F. The exact temperature maintained depends on the inlet water temperature and the rate of water usage. For a given setting of the faucet, the user will get a constant supply of hot water at a constant temperature.

The invention has the following merits.

1. The ability to supply hot water continuously without a drop in temperature.
2. Absence of burner cycling on and off during hot water use and this eliminates temperature fluctuations at the point of use.
3. A high thermal efficiency which is over 90% for minimum standby energy losses and the tank does not need insulation.
4. A tall chimney or a stack is not required and the unit may be vented to the outside of the building using a short length of vent pipe such as about four feet in length or may be connected to a common chimney or gas vent with other gas fired appliances.
5. The unit is compact and a 100,000 BTU/hour unit may be about 36" in height and 12" in diameter.
6. The unit has a low noise level; and
7. The unit is safe and dependable in operation and uses proven residential type controls connected so as to provide a high level of safety.

The unit functions as an instantaneous water heater in that it heats water only when the hot water is being drawn through it and the small standby heat loss is compensated by the heat gain from the pilot light. But unlike other instantaneous water heaters, it has a storage tank of limited capacity which might be approximately 6 gallons. Combustion in the unit is initiated when the temperature of the stored water in the tank drops below a set value in the same way as in a conventional tank water heater. Therefore, no minimum rate of use of hot water is required to fire the unit. In prior art instantaneous water heaters, combustion is initiated by a device which senses the differential pressure across an element in the water line created by the flow of water across it. Therefore, water usage at a significant rate such as ¾ gallon per minute is required to fire the unit. The present invention shuts off when the stored water temperature exceeds a set maximum. The present water heater is of the fire tube type where there are hot gases inside the tubes and there is water outside of the tubes and prior art instantaneous water heaters are of the water tube type where the water flows through the tubes and the hot gases flow outside of the tubes. Consequently, pressure drop in the water line in the water heater of the invention is much lower than those in instantaneous water heaters of the prior art for equal values of water flow rates. Also, the higher heat transfer rates on the gas side achieved with the design of the invention eliminate the need for fins which are an essential part of water tube type instantaneous water heaters of the prior art.

Other features, objects and advantages of the invention will be readily apparent from the following description of certain preferred embodiments thereof, taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a side sectional view of the invention;

FIG. 2 is a sectional view through the gas flow modulator;

FIG. 3 is an enlarged sectional view of the gas modulator valve;

DESCRIPTION OF THE PREFERRED EMBODIMENTS

Figure 4:
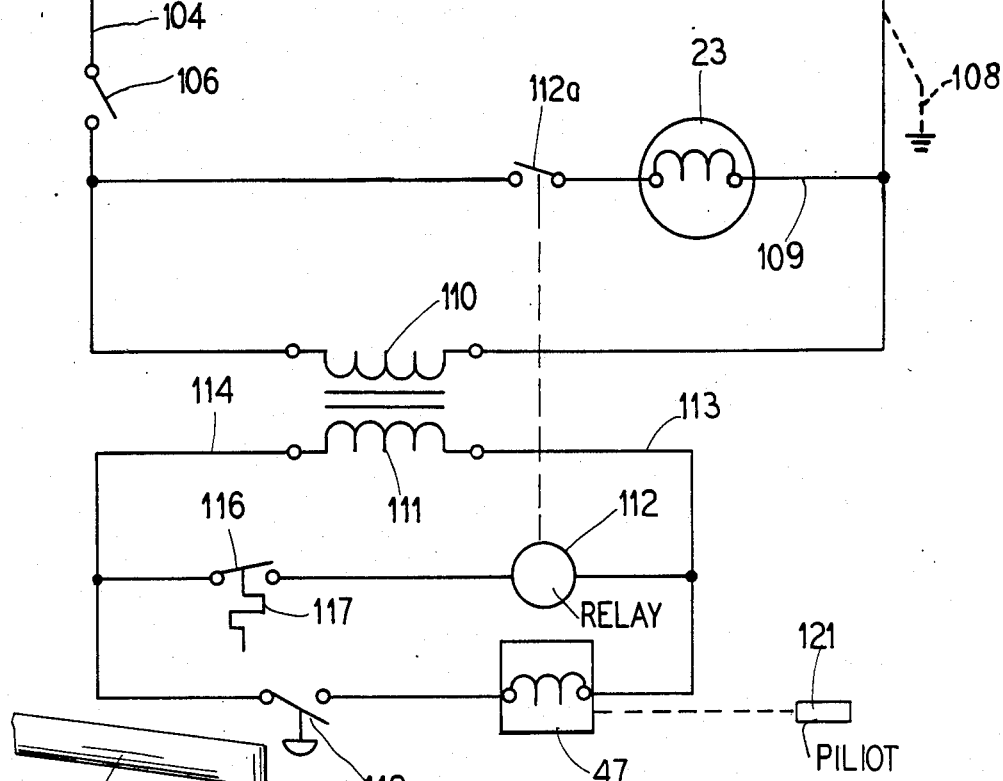
FIG. 4 is an electrical schematic of the control system of the invention.

FIG. 1 illustrates the continuous flow energy efficient water heater 10 according to the invention which contains a generally cylindrically-shaped tank with outer walls 11 and bottom wall 12 and upper wall 13 which may be made of metal such as stainless steel which is a relatively poor conductor of heat. A central flue 26 of generally cylindrical shape is mounted in the water heater 10 as illustrated and is open at the bottom to allow a gas burner and pilot light to introduce burning gases therein. Adjacent the outer wall 11 and spaced therefrom is an inner cylindrical member 16 which is attached to the top 13. A second cylindrical member 17 is attached to the top 13 inwardly of the member 16 and is adjoined at the bottom end with the bottom end of the member 16 by a annular member 18. A plurality of tubes 29a through 29e extend through the space between the member 17 and the central flue 26 from the top of the flue and are adjoined to the flue by short pipe segments 28a through 28e which terminate in the flue as shown. Short pipe segments 31a through 31e are connected to the lower ends of the pipes 29a through 29e and open into the space between the members 16 and 17 as shown. An exhaust gas exit 20 is formed between two funnel shape members 19 and 21 which are connected to the top 13 of the heater 10 and allow gases in the space 14 between the members 16 and 17 to pass therethrough to a blower 23 which is connected to a output chimney or pipe 22 which vents the gases outside the building. The members 16, 17, 26 and the pipes 28, 29 and 31 are made of a material of high heat conductivity such as copper.

A hot water outlet pipe 69 is connected to the top 13 of the heater 10 and communicates with the space 68 between the member 17 and 26. The hot water pipe 69 is connected to a number of hot water faucets and supplies hot water on demand in response to opening and closing of the faucets. Cold water is supplied to the system through cold water inlet pipe 61 which passes through a differential pressure generator 62 and then through a pipe 63 which is connected by a short pipe 64 to the space 66 between the wall 11 and the inner member 16 as illustrated. Combustion gas is supplied by an inlet gas supply pipe 46 which is connected to a gas control valve 47 which is connected by a short pipe 48 to a gas modulator valve 49 which has an output pipe 51 which has outlet orifices 52 formed in its end through which the gas is supplied for ignition. A variable rate gas burner 39 is generally L-shape and has a lower end which fits around the burner pipe 51 and an upper trumpet-shaped end 41 from which the burning gas is admitted. A pilot light is provided by the end 20 of a pilot tube 30 which is connected to the gas control valve 47 as illustrated. A housing comprising a bottom member 36 and sidewalls 37 and 38 surround the variable rate burner 39 as illustrated. An opening is formed in the wall 37 to allow air to pass up into the burning chamber.

A flame suppressor 42 of generally curved shape is supported by a rod members 43 and 44 from the inner walls of the flue 26 and the burned gas is passed into the central flue above the member 42 and then passes through the pipes 28a through 28e down through the pipes 29a through 29e where they are in contact with water to heat it and then passes into the space 14 between the members 16 and 17 where additional heat is given to the water in the space surrounding. Then the gas passes through the space 20, the blower 23 and through the exhaust vent 22. A conical member 71 is attached to the upper end of the central gas flue 26 and has a valve 73 which normally closes an opening 74 which communicates with the space 20 when the blower 23 is operating and the member 70 is formed with an opening 72 and prevents the valve 73 from falling by gravity into the flue 26 when the blower 23 is not operating. The valve 73 is a safety device which will be described in detail later.

The heat exchanger is designed to provide the highest rate of heat transfer between the gas and water. The three pass gas/air flow through the central flue, the tubes and the annulus between the inner cylinders is induced by the blower 23. The rate of gas/air flow is large enough to provide the required values of convection heat transfer coefficients on the gas side of the heat exchange surfaces. On the water side, the advantages of counter flow and parallel flow heat exchange mechanisms are employed to achieve high rates of heat transfer together with high thermal efficiency. Counter flow occurs at heat transfer surfaces 16 and the surfaces of the tubes 29 and parallel flow occurs at the heat transfer surfaces 17 and 26. The exit gas temperatures may be in the range of 160° F. to 200° F. and are typical for exit water temperatures varying from 130° F. to 160° F. Such low values of exit gas temperatures can be realized without fear of moisture condensation due to the very low values of steam partial pressures which exist. The low values of steam partial pressures result from the large amount of excess air induced by the blower 23.

The gas modulator valve 49 is to regulate the gas flow to the burner proportional approximately to the rate of hot water consumption. By achieving this, the gas modulator valve 49 eliminates the need for cycling of the burner so that it intermittently goes on and off and the consequent fluctuations in water temperature which would occur during use.

The gas modulator valve 49 is illustrated in detail in FIG. 2 and comprises a generally cylindrical outer wall 90. A bottom cover wall 86 is connected to a water pressure pipe 61 which is connected to the high pressure side of the differential pressure geneator 62. The diaphragm 87 is mounted within the gas modulator valve 49 and a space 88 which receives the water from pipe 61 is provided between the bottom cover member 86 and the diaphragm 87 such that pressure variations in the chamber 88 move the diaphragm 87. A shaft 79 is connected to the diaphragm 87 and is supported by bearings 83 and 84 which are supported by partitions 81 and 82 that are connected to the outer wall 90 of the modulator valve 49. A piston 78 is carried by the shaft 79 and the upper end of the shaft 79 is connected to a disc 93 that is connected to a diaphragm 91. A spring 94 is mounted between the diaphragm 91 and a tension adjusting screw 97 which has a lower disc member 98 and is threadedly received in an extending portion 96 of the top cover member 89. Water is supplied by the pipe 63 to the space 92 between the diaphragm 91 and the cover 89 and the pipe 63 is connected to indicate the water pressure from the low pressure side of the differential pressure generator 62. The gas pipe 48 is connected to the input of the gas flow modulator 49 and includes a one-way valve comprising a ball valve 174 which is receivable in a valve seat 76 in a member 32 so as to prevent water from passing back into pipe 48 and a restrainer 173 is connected to the walls of pipe 48 and restrains the position of the ball 174. The output pipe 51 is connected to the burner and includes a valve including a ball 120 which is receivable in a ball seat 121 in member 122. A retainer 123 restricts movement of the ball 120. The valve 120 prevents water from passing from the gas flow modulator 49 and flowing through the burner in case of rupture of the diaphragm. A gas port is formed with a diaphragm 126 over the end of pipe 171 and has an opening 70 as illustrated in FIG. 3 which is partially covered by the piston 78 in different positions. As the piston 78 moves upwardly and downwardly relative to FIG. 3 and FIG. 2 the gas port 70 is uncovered so that gas from the pipe 171 can pass from pipe 171 into pipe 51 and, thus, to the burner. A stop 75 is provided at the bottom of the piston 78 so as to limit the downward motion of the piston as illustrated.

The differential pressure generator 62 applies a differential pressure force in direct relation to the rate of hot water use on the two diaphragms 87 and 91. The deflection of the diaphragm moves the piston 78 which varies the port openings in the modulator valve. The variation in the area of the port openings is directly related to the variation in the rate of water flow through the differential pressure generator 62. At low gas flow rates, the major part of the pressure drop in the gas flow takes place across the modulator 49. Only a smaller fraction of the pressure drop occurs at the burner openings. As the gas flow increases, the fraction of the pressure drop occurring across the burner openings 52 steadily increases. At the highest values of gas flow rate about 90% of the pressure drop might be occurring at the burner openings.

The gravity type ball valves 174 and 120 in the inlet and outlet pipe provides safety from water accidentally getting into the gas pipes. Should water leak into the gas space of the modulator 49, say due to a rupture diaphragm, the ball valves would float in water and would rise against their valve seats and thus prevent water from getting into the gas pipes.

The variable rate gas burner permits stable and complete combustion of gas at widely varying rates. When the gas control valve is open, gas flows through the gas modulator valve 49 and the set of uniformly distributed openings 52 on the end plate of the gas pipe into the mixing zone in the variable rate gas burner pipe 39. Primary air drawn by the blower 23 mixes with the gas in the mixing zone and combustion is initiated at the top of the flame spreader screen by a pilot flame. The secondary air which forms about 65% of the total air flow induced by the blower 23 mixes with the flame and the gas/air mixture immediately above the low flame stabilizer. The stabilizer with the suppressor plate allows stable combustion over widely varying rates of gas flow.

FIG. 4 illustrates the automatic controls of the system and comprises an electrical schematic. The thermostat 117 controls the range of hot water temperature in the heater. It has a low set point such as 140° F. and a high set point such as 160° F. When the hot water faucet is opened which is connected to the outlet pipe 69, for example, the water temperature inside the heater begins to drop. When it drops below the low set point of the thermostat 117, the thermostat closes an electrical circuit which actuates a relay 112 which closes the switch contacts 112a to the blower 23 thus turning on the blower. When the air flow builds up sufficient pressure differential across the blower such as 0.5" to 1.0" of water, the differential pressure switch 119 close a parallel electrical circuit which causes the gas valve 47 to open. The differential pressure switch 119 normally remains open and is of the fail safe type. In the event draft created by the induced draft fan 23 drops substantially such as due to a bearing failure, the hollow copper ball 73 will drop down and allow a straight vertical passage for the gases from the central gas flue 26 through outlet pipe 22. Of course, under normal operation, the suction of the blower 23 keeps the ball 73 in the valve seat 74 so that the gases pass through the pipes 29a through 29e. This prevents short circuiting of the combustion gases in any significant quantities. Therefore, even if the differential pressure switch 119 gets stuck in the closed position and the blower 23 is turning at a low speed, there will not be any danger of either the combustion gases or the unburned gases escaping into the building. They will naturally vent to the outside through the short stack pipe 22.

Also, in the event the pilot flame goes out, the gas valve 47 cuts off the supply of gas to both the burner and the pilot so as to prevent gas from escaping. The operation of the gas valve 47 is such that since it is turned on by demand for hot water, it remains open as long as the hot water use continues. When the hot water faucet is shut off, the water temperature inside the heater rises until it reaches the high set point of the thermostat 117. At that time, the thermostat opens the electrical circuit that shuts off the gas valve.

In FIG. 4, the power input terminals 101, 102 are respectively connected to power lines 104 and 107 with a circuit breaker 103 in line 104. An on-off switch 106 is connected in line 104 and is connected to the primary 110 of a transformer which has its other side connected to line 107 which has a virtual ground 108. A line 109 is connected to line 107 and to one side of blower 23 and the other side of blower 23 is connected by switch contacts 112a to the other side of the primary 110. The secondary 111 of the transformer has output leads 113 and 114 and the thermostat 117 controls a switch 116 which is in series with a relay 112 which has its other side connected to line 113. The relay 112 is mechanically connected to the switch contacts 112a to close them when the relay 112 is energized. The automatic gas control valve 47 is connected to line 113 and to the differential pressure flow sensing switch 119 which has its other side connected to line 114.

Figure 5:
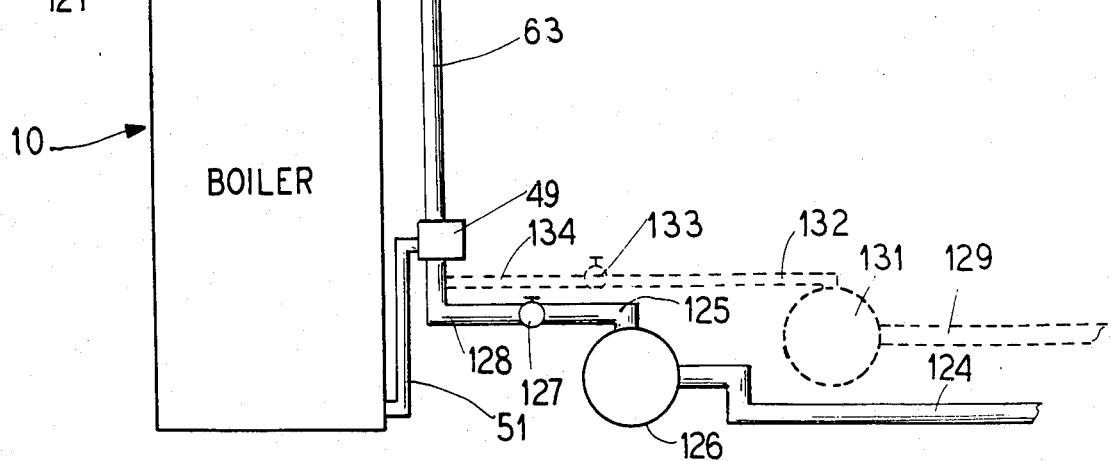
FIG. 5 illustrates a modification of the invention as used as a space heating boiler.

FIG. 5 illustrates a modification of the invention used as a space heating boiler. A small centrifugal pump 126 is added to the system so as to circulate water through the space heating pipes or radiator and the boiler 10 in a closed circuit. For individual temperature control of different areas in a building separate pumps 126 can be used in parallel circuits as shown with the second pump 131 illustrated in dashed line. Each pump will be turned off and on by a separate thermostat. The total quantity of water discharged from all of the pumps flows through the differential pressure generator which regulates the gas flow modulator 49. Valve 127 and valve 133 can be set at any desired openings so as to vary the proportion of water flow rate through the heating pipes in any particular zone. Thus, different heating rates for different zones in a building can be accomplished if desired. The boiler can be easily adapted for modular heating such as several units in parallel systems with the distinct advantage over single large size conventional boilers. A make-up water pipe 121 supplies through a valve 122 water to keep the closed system full from supply pipe 123. Pipe 69 supplies hot water to the various rooms to be heated. A safety valve 140 prevents excessive pressures from building up in the closed system. The return water from a room in zone 1 pass through return pipe 124 to pump 126 which supplies it through pipe 125 and valve 127 to pipe 128 which supplies it to the gas flow modulator 49 to control the gas flow to the burner. Return water from rooms comprising the zone number 2 pass through a return pipe 129 a second blower 131 to pipe 132 and valve 133 to pipe 134 and to gas flow modulator 49 to control the gas flow to the burner. It is to be realized that the zones 1 and 2 are both connected to the hot water supply pipe 69.

It is seen that this invention provides improved system for heating hot water and although it has been described with respect to preferred embodiments, it is not to be so limited as changes and modifications may be made therein which are within the full intended scope as defined by the appended claims.

We claim as our invention:

1. A compact continuous flow, high efficiency water heater, comprising a generally cylindrical tank, a central flue mounted in said tank, a gas fired burner mounted to supply burning gases to said flue, a plurality of tubes connected to the top of said flue and extending downwardly through a water chamber formed in said tank to heat water therein, an annular-shaped exhaust chamber formed in said tank and said plurality of tubes connected to the lower end thereof, and with said water chamber surrounding said annular-shaped exhaust chamber, an exhaust pipe; connected to the upper end of said annular-shaped exhaust chamber to vent the burned gasses and inlet and outlet water pipes connected to said tanks, wherein said generally cylindrical outer tank is formed of material having low heat conductivity, wherein said central flue, said plurality of tubes and said annular-shaped exhaust chamber are formed of material having high heat conductivity, and comprising a gas modulator valve connected between said fired burner and a gas supply pipe and controlling the gas supply as a function of the water flow rate.

2. A compact, continuous flow, high efficiency water heater according to claim 1 including a differential pressure generator connected in the inlet pipe and supplying pressure inputs to said gas modulator valve to control it.

3. A compact continuous flow, high efficiency water heater according to claim 2 wherein said gas modulator has two diaphragms connected to a moveable piston which controls the gas inlet and outlet port openings on the body of the modulator valve.

4. A compact continuous flow, high efficiency water heater according to claim 3 including a blower coupled to said exhaust pipe to impell the exhaust gases therethrough.

5. A compact continuous flow, high efficiency water heater, comprising a generally cylindrical tank, a central flue mounted in said tank, a gas fired burner mounted to supply burning gases to said flue, a plurality of tubes connected to the top of said flue and extending downwardly through a water chamber formed in said tank to heat water therein, an annular-shaped exhaust chamber formed in said tank and said plurality of tubes connected to the lower end thereof, and with said water chamber surrounding said annular-shaped exhaust chamber, an exhaust pipe connected to the upper end of said annular-shaped exhaust chamber to vent the burned gasses and inlet and outlet water pipes connected to said tanks, wherein said generally cylindrical outer tank is formed of material having low heat conductivity, wherein said central flue, said plurality of tubes and said annular-shaped exhaust chamber are formed of material having high heat conductivity, comprising a gas modulator valve connected between said fired burner and a gas supply pipe and controlling the gas supply as a function of the water flow rate, including a differential pressure generator connected in the inlet pipe and supplying pressure inputs to said gas modulator valve to control it, wherein said gas modulator has two diaphragms connected to a moveble piston which controls the gas inlet and outlet port openings on the body of the modulator valve, and including a blower coupled to said exhaust pipe to impell the exhaust gases therethrough, and including a one way valve between said central flue and said exhaust pipe and said one way valve normally closed when said blower is energized.

6. A compact continuous flow, high efficiency water heater according to claim 1 with a variable rate gas burner that is capable of burning gas at widely varying rates such as form 0.2 cfm to 2.5 cfm.

* * * * *